ously in the process, and mixtures thereof to produce a pumpable feed mixture stream having a solids content in the range of about 25 to 70 weight percent and preferably in the range of about 30 to 50 weight percent; preferably preheating the feed mixture stream to produce a feed dispersion stream comprising bits of garbage and solid waste matter, particulate carbon, liquid and vaporized hydrocarbon fuel, and steam, and reacting said feed mixture or dispersion stream by partial oxidation with a stream of oxygen-rich gas in the reaction zone of a free-flow noncatalytic unpacked synthesis gas generator at an autogenous temperature in the range of about 1500 to 3000° F. and a pressure in the range of about 1 to 250 atmospheres to produce a stream of synthesis gas, fuel gas, and other valuable by-products.

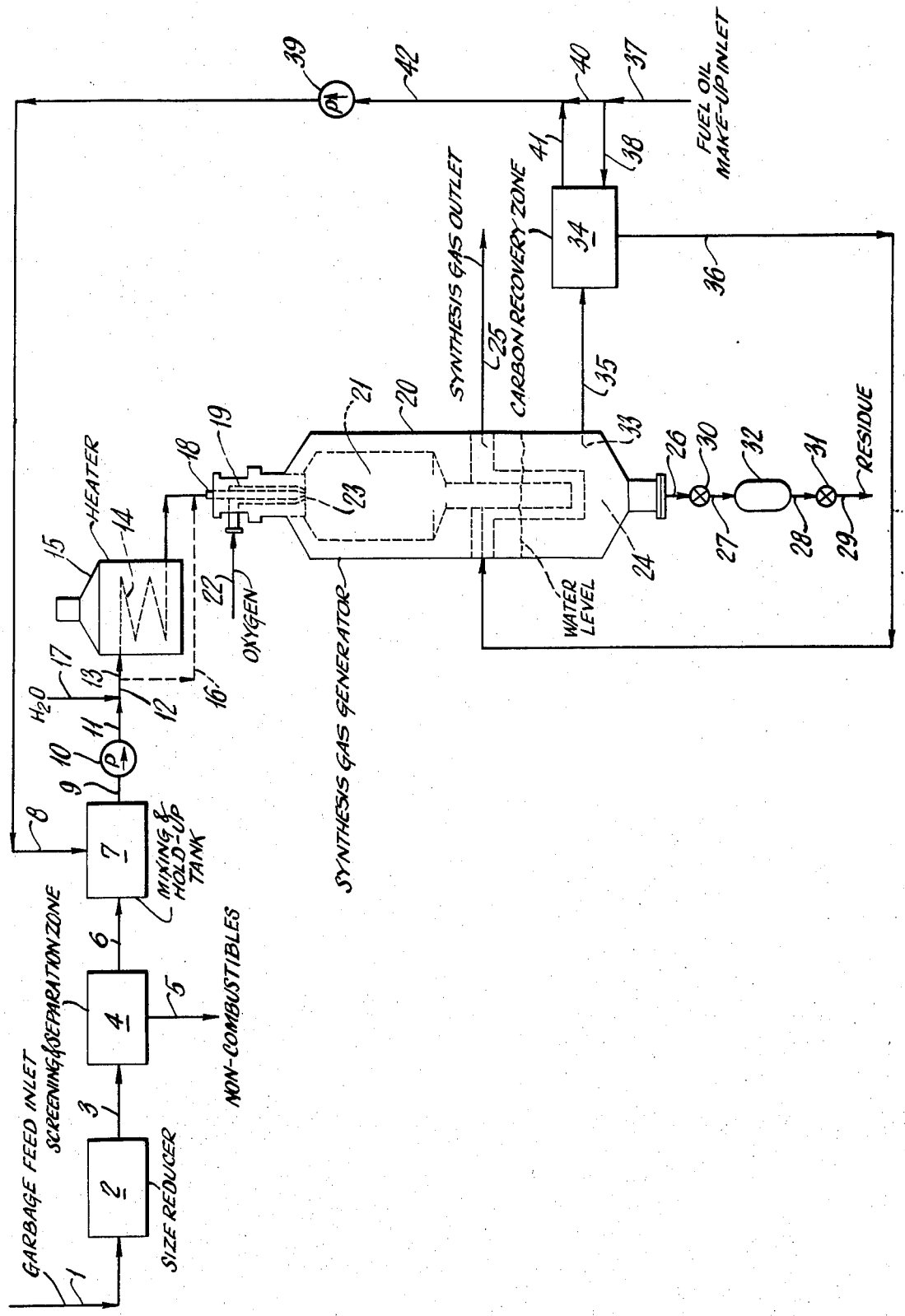

United States Patent Office 3,671,209
Patented June 20, 1972

3,671,209
GARBAGE DISPOSAL PROCESS
Charles F. Teichmann, Houston, Tex., and Albert Brent, Dix Hills, N.Y., assignors to Texaco Development Corporation, New York, N.Y.
Filed Dec. 21, 1970, Ser. No. 100,108
Int. Cl. C10j 3/00, 3/16
U.S. Cl. 48—209
6 Claims

ABSTRACT OF THE DISCLOSURE

Garbage and other inorganic and organic solid waste matter is reduced to small size and mixed with a fluid selected from the group consisting of $H_2O$, liquid hydrocarbon fuel, liquid hydrocarbon fuel-particulate carbon slurry or particulate carbon-water slurry produced subsequently in the process, and mixtures thereof to produce a feed mixture stream. The feed mixture is preferably preheated to produce a feed dispersion stream comprising bits of garbage and solid waste matter, particulate carbon, liquid and vaporized hydrocarbon fuel, and steam. By the partial oxidation of the feed mixture or dispersion stream with a stream of oxygen-rich gas in the reaction zone of a free-flow unpacked noncatalytic synthesis gas generator at an autogenous temperature in the range of about 1500 to 3000° F. and at a pressure in the range of about 1 to 250 atmospheres, the garbage and solid waste matter are converted into a stream of synthesis gas or fuel gas, and other valuable by-products.

BACKGROUND OF THE INVENTION

Field of the invention

This invention relates to a novel process for disposing of garbage without polluting the nation's environment, while simultaneously producing synthesis gas or fuel gas, and other valuable by-products.

Description of the prior art

Ecologists are alarmed at the increasing deterioration in the quality of today's urban environment. Solid wastes are now being generated in urban areas at the annual rate of nearly one ton per capita, and this rate may double by the year 2000. Solid waste disposal currently costs U.S. municipalities about $4.5 billion per year and commonly ranks as the third highest expense incurred by local governments (behind education and roads).

The predominant disposal method for garbage and other solid wastes is land fill i.e., dumping, with or without open-pit burning. However, available land fill sites close to metropolitan areas are rapidly being exhausted, and costs of land, covering the garbage with dirt, and hauling are significant expense factors. Also, toxic wastes from buried trash seep into and pollute underground streams which are commonly the source of our fresh water. Further, on-site burning, as well as incineration an alternative disposal method, contribute heavily to air-pollution from noxious gases and soot. It is obvious from the aforesaid that the disposal of garbage and other solid waste matter is one of the nation's most pressing environmental problems.

SUMMARY

This is a continuous process for disposing of garbage and solid waste matter comprising the steps of reducing the size of said material to bits of garbage and solid waste matter in a size reduction zone; mixing said bits of material with a sufficient amount of fluid selected from the group consisting of $H_2O$, liquid hydrocarbon fuel, liquid hydrocarbon fuel-particulate carbon slurry or particulate carbon-water slurry produced subsequently in the process, It is therefore a principal object of the invention to alleviate the mounting problem of garbage and solid waste disposal without polluting the nation's environment.

Another object of the invention is to dispose of garbage and other solid waste material by means of a low cost continuous process which simultaneously produces valuable by-products e.g., synthesis gas.

DESCRIPTION OF THE INVENTION

The present invention involves an improved continuous process for disposing of garbage and other solid wastes without polluting the nation's environment. Simultaneously, profitable by-products are produced in the form of synthesis gas, fuel gas, and soil improvers.

The term "garbage and solid waste matter" as used herein comprises municipal refuse. A typical municipal refuse composition is shown in Table I.

TABLE I

| | Weight percent |
|---|---|
| Miscellaneous paper | 25 |
| Newspaper | 14 |
| Animal and vegetable refuse | 12 |
| Grass and dirt | 10 |
| Glass, ceramics, stones | 10 |
| Metallics | 8 |
| Cardboard | 7 |
| Wood | 7 |
| Textiles | 3 |
| Plastic film | 2 |
| Leather, molded plastics, rubber | 2 |
| Total | 100 |

In Table II there is shown as typical ultimate analysis of the municipal refuse from a large metropolitan area.

TABLE II

| | Weight percent |
|---|---|
| Moisture | 28.0 |
| Carbon | 25.0 |
| Oxygen | 21.1 |
| Glass, ceramics, etc. | 9.3 |
| Metals | 7.2 |
| Ash | 5.5 |
| Hydrogen | 3.3 |
| Nitrogen | 0.5 |
| Sulfur | 0.1 |
| Total | 100.0 |

In one embodiment of the subject process, the non-combustible metal, glass, and ceramics such as cans, bottles, etc. are separated to a large extent from the combustible organic refuse to produce beneficiated garbage. This may be done either at the receiving plant or by the householder on a city-wide basis. Typical compositions of beneficiated garbage and solid waste material from two cities are shown in Table III.

of a liquid hydrocarbon fuel-particulate carbon slurry produced subsequently in the carbon-recovery zone.

TABLE III

|  | Altoona, Pa. (weight percent) | | | Madison, Wis. (weight percent) | | |
| --- | --- | --- | --- | --- | --- | --- |
|  | As received | Dry | Dry and ash free | As received | Dry | Dry and ash free |
| Composition: | | | | | | |
| Carbon | 34.7 | 49.9 | 58.3 | 35.1 | 38.7 | 55.1 |
| Oxygen | 47.0 | 28.6 | 33.5 | 31.6 | 25.7 | 36.6 |
| Hydrogen | 7.4 | 5.8 | 6.8 | 5.7 | 5.1 | 7.3 |
| Nitrogen | 0.7 | 1.0 | 1.1 | 0.5 | 0.6 | 0.8 |
| Sulfur | 0.2 | 0.3 | 0.3 | 0.1 | 0.1 | 0.2 |
| Ash, other noncombustibles | 10.0 | 14.4 |  | 27.0 | 29.8 |  |
| Volatile matter | 50.2 | 72.3 | 84.5 | 51.8 | 57.2 | 81.4 |
| Moisture | 30.6 |  |  | 9.4 |  |  |
| Fixed carbon | 9.2 | 13.3 | 15.5 | 11.8 | 13.0 | 18.6 |
| B.t.u. per pound | 5,670 | 8,170 | 9,540 | 5,790 | 6,390 | 9,110 |

Size reduction may be effected by means of any suitable combination of conventional crushing, grinding, cutting and pulping equipment. Suitable size reduction, screening and separating equipment is described in Perry's Chemical Engineers' Handbook, McGraw-Hill, New York, Fourth Edition, 1963, pages 8-2 to 59, 21-46 to 48 and 21-63 to 67. Specific equipment will depend upon the type of solid waste material that is being processed. For example, beneficiated garbage may be reduced to small bits by means of suitable grinding, cutting, and pulping equipment. Rotary cutters of the type shown in FIG. 8-61 of Perry's Chemical Engineers' Handbook are useful as are standard paper making equipment such as the Hydrapulper and Jordan refiner as shown in the Encyclopedia of Chemical Technology, Kirk-Othmer Interscience, 1967, Volume 14, pages 497-500. When glass and metals such as bottles and light gauge tin cans and wire are reduced in size along with the rest of the garbage and solid waste matter, crushing and slitting equipment may be included in the size reduction step.

The garbage and solid waste matter are reduced to a particle size of about 1/16" or less. Particle size as well as the amount of metals and other noncombustible solids in the feedstream may be controlled by standard equipment for screening, gravity settling chambers, and by magnetic separators as previously described.

The feed is then mixed with a fluid selected from the group consisting of $H_2O$, liquid hydrocarbon fuel, liquid hydrocarbon fuel-particulate carbon slurry or particulate carbon-water slurry produced subsequently in the process, and mixtures thereof so as to produce a pumpable feed mixture having a solids content in the range of about 25 to 70 weight percent and preferably in the range of about 30 to 50 weight percent. When noncombustible solids are present in the feed it is preferable that they not exceed about 30 weight percent. The aforesaid fluidizing medium may be in the liquid or vapor state, or both.

Mixing may be done by means of a suitable mixer such as an in-line venturi mixer and conventional mixing equipment as described in the aforementioned Perry's Chemical Engineers' Handbook pages 19-3 to 19-16. Mixing tanks of sufficient hold-up capacity to smooth out any discontinuity in the composition of the feedstock are suggested. The term liquid hydrocarbon fuel as used herein encompasses almost any liquid hydrocarbon fuel suitable for charging a synthesis gas generator including: butane, pentane, hexane, benzol, toluol, natural gasoline, gasoline, naphtha, gas oil, residual fuel, reduced crude, whole crude, coal tar oil, shale oil, tars and oil, and mixtures thereof. Preferably, the liquid hydrocarbon fuel has a gravity in the range of about 5 to 50° API and a gross heating value in the range of about 17,000 to 18,500 B.t.u. per pound. Heat may be required to make some fluids pumpable. The liquid hydrocarbon fuel may be added directly from an outside source; or, as in a preferred embodiment of the process, it may be a constituent $H_2O$ may be used alone or in combination with other fluidizing mediums and may be supplied either in the liquid or gaseous phase. When steam is used, its sensible heat facilitates the mixing step. Optionally, the feed may be admixed with steam prior to, during, or after the bits of garbage and solid waste matter are mixed with the liquid hydrocarbon fuel. When $H_2O$ is used in combination with a liquid hydrocarbon fuel and preferred weight ratio of $H_2O$ to liquid hydrocarbon fuel is in the range of about 0.2 to 0.5 part by weight of $H_2O$ for each part of liquid hydrocarbon fuel. In one embodiment of the invention, the $H_2O$ is a constituent in a particulate carbon-water slurry produced subsequently in the carbon-recovery zone.

The aforesaid feed mixture may be moved by means of a suitable conveying system e.g., slurry pump or screw conveyor. Although the feed mixture or slurry stream may be introduced at ambient temperature directly into a synthesis gas generator, it is preferably heated to a temperature in the range of about 212° F. to 600° F. by means of an externally fired tubular furnace or heat exchanger to produce a feed dispersion or suspension of bits of garbage and solid waste matter entrained in vaporized or liquid hydrocarbon fuel and steam. Further by making the tubular furnace of relatively great length in comparison with its cross sectional area (for example about 1" to 8" inside diameter and larger and about 500-4000 ft. long) and by controlling the volume and the velocity of the feed slurry to ensure highly turbulent flow conditions therein, the entrained bits of garbage and solid waste matter in the slurry may be further disintegrated and dispersed. It is preferable to maintain the velocity of the mixture of bits of garbage and solid waste matter, liquid hydrocarbon fuel, and $H_2O$ at the inlet to the tubular heater in the range of about 10 to 30 feet per second.

Any suitable means may be used to introduce the stream of feed mixture or dispersion into the synthesis gas generator. Preferably, an annulus type burner may be used, such as described in co-assigned U.S. Pat. No. 2,928,460 issued to Du Bois Eastman et al., which patent is incorporated herewith by reference. Such annulus type burners were previously employed only for heavy liquid hydrocarbon fuels. Alternately, the feed mixture or dispersion may be introduced into the upper end of the elongated cylindrical vertical reaction zone through a port. In such case, oxygen at high velocity is then introduced into the reaction zone through a separate port which discharges the oxygen stream directly into the stream of garbage and suspending medium. By this arrangement, the oxygen, steam, hydrocarbon fuel, carbon, and suspended solids are intimately admixed within the reaction zone, and the stream of oxygen is prevented from directly impinging on the wall of the reactor.

As shown in the drawing for this specification, the discharge end of an annulus type burner assembly is inserted into the reaction zone of a compact unpacked free-flow noncatalytic refractory-lined synthesis gas generator of the type described in U.S. Pat. 2,818,326 issued to Du Bois Eastman et al., which patent is incorporated herewith by reference. The discharge end of the annulus burner comprises an inner conduit through which the feed mixture or dispersion may be passed, surrounded by an annular passage through which a stream of gas rich in free-oxygen may be passed. The oxygen-rich gas may be either air, oxygen enriched air (40 mole percent $O_2$ and more), preferably substantially pure oxygen (95 mole percent $O_2$ and more), or mixtures of steam and one of said oxygen-rich gases. Near the tip of the burner the annular passage converges inwardly in the shape of a hollow right cone. The oxygen-rich gas is thereby accelerated and discharged from the burner as a high velocity conical stream having an apex angle in the range of about 30° to 45° and an apex located from about 0–6 inches beyond the burner face. When the high velocity stream of oxidizing gas hits the relatively low velocity stream of the feed mixture or dispersion the particles of garbage and solid waste matter impinge against one another and are fragmented still further. The discharge velocity of the feed mixture or dispersion from the burner is in the range of 5 to 50 feet per second and the discharge velocity of the oxygen-rich gas is greater than 100 feet per second and preferably in the range of 200 feet per second to sonic velocity at the burner tip. Further, the feed to the burner may be reversed. In such instance, the feed mixture or dispersion is passed through the annular passage while the oxygen-rich gas is passed through the inner conduit. The temperature of the oxygen-rich stream is in the range of about ambient to 1000° F. and preferably about 200 to 400° F.

The relative proportions of garbage and solid waste matter, noncombustible solids, liquid and vaporized hydrocarbon fuel, $H_2O$, particulate carbon, and oxygen-rich gas fed to the reaction zone are regulated within the following ranges to ensure an autogenous temperature in the gas generation zone within the range of 1500–3000° F. and to produce about 0.1 to 10 wt. percent (weight percent) of particulate carbon (basis carbon in the feed), and preferably about 1 to 4 wt. percent. The particulate carbon is entrained in the effluent stream of product gas leaving the reaction zone along with any noncombustible solids. The efficiency of the process may be increased by recovering said particulate carbon and recycling it to the reaction zone as a portion of the feed. The product gas comprises in mole percent dry basis: $H_2$—25 to 45, CO—20 to 55, $CO_3$—5 to 35, $CH_4$—0.06 to 8, and COS+$H_2S$—.1 to 2.0. Operating conditions in the gas generator may include: pressure in the range of about 1 to 250 atmospheres, atomic ratio of free oxygen to carbon in the feed in the range of about 0.8 to 1.4 atoms of O for each atom of carbon, weight ratio of water to carbon in the feed in the range of about 0.2 to 3.0 parts of $H_2O$ to 1 part of carbon, and a time in the reaction zone of about 1 to 10 seconds.

The hot gaseous effluent stream from the reaction zone of the synthesis gas generator is quickly cooled below the reaction temperature to a temperature in the range of 300–700° F. In a preferred embodiment of our invention, the hot gaseous effluent stream is cooled below the reaction temperature by direct quenching in water. For example, the cooling water may be contained in a quench vessel or chamber located immediately down-stream from the reaction zone of said gas generator. A large diameter dip leg starting at the bottom end of the reaction zone and discharging beneath the water level in the quench chamber serves as an interconnecting passage between the reaction zone and the quench zone through which the hot product gases may pass. This conduit also substantially equalizes the pressure in the two zones. A concentric draft tube open on both ends surrounds said dip leg, creating an annulus through which the mixture of gas and water rises vigorously and splashes against the support plate of the reactor floor. The water and gas then separate in the quench chamber in the space outside the draft tube. This circulation of water through the draft tube system maintains the entire quench system at essentially the temperature of the water leaving the quench vessel, which is also the temperature of the saturated steam in the quench zone. Recycle water from the carbon recovery zone to be further described is normally introduced through a quench ring at the top of the dip-leg to cool the metal at that point. Large quantities of steam are generated in the quench vessel and the quench chamber may be likened to a high output, high pressure boiler.

The turbulent condition in the quench chamber, caused by the large volumes of gases bubbling up through said annulus space, helps the water to scrub substantially all of the solids from the effluent gas, forming a disperion of unconverted particulate carbon and quench water. Further, additional steam required for any subsequent process step may be picked up by the effluent synthesis gas during quenching. For a detailed description of a preferred quench chamber, reference is made to U.S. Pat. 2,896,927, issued to R. E. Nagle et al., which is herewith incorporated by reference. Any residual solids in the cooled and scrubbed effluent synthesis gas leaving the quench chamber may be removed by means of a conventional venturi or jet scrubber, such as described in Perry's Chemical Engineers' Handbook, Fourth Edition, McGraw-Hill Co., 1963, pages 18–55 to 56.

Alternately, the hot effluent gas stream from the reaction zone of the synthesis gas generator may be partially cooled to a temperature in the range of about 300 to 650° F. by indirect heat exchange in a waste heat boiler. The entrained solid particles may be then scrubbed from the effluent synthesis gas by contacting and further cooling the effluent stream of synthesis gas with quench water in a gas-liquid contact apparatus, for example, a spray tower, venturi or jet scrubber, bubble plate contactor, packed column, or in a combination of said equipment. For a detailed description of cooling synthesis gas by means of a waste heat boiler and a scrubbing tower, reference is made to U.S. Pat. 2,980,523, issued to R. M. Dille et al.

The synthesis gas leaving the cooling and scrubbing zone and comprising on a dry basis $H_2$, CO, $CO_2$ and minor amounts of such gases as $H_2S$, A, COS, and $CH_4$ may be used as a source of feed gas for the synthesis of hydrocarbons, oxygen containing organic compounds, or ammonia. The unwanted constituents are removed and safely disposed of by conventional methods.

The synthesis gas may be further processed by methods well known in the art to produce hydrogen for use in hydrogenation reactions. For example, the cooled and scrubbed synthesis gas is reacted with steam at a temperature in the range of about 750° F. to 1012° F. over a conventional water-gas shift catalyst e.g., 85 wt. percent of $Fe_2O_3$ and 15 wt. percent of $Cr_2O_3$ to convert the CO into $H_2$ and $CO_2$. Following shift conversion, carbon dioxide and other acid gas constituents are removed by refrigeration or chemical absorption with hot potassium carbonate, alkanolamine solutions, or other absorption materials. Carbon monoxide may be removed by scrubbing the gas with an aqueous solution of cuprous ammonium chloride or by catalytic methanation. Further, pure liquid nitrogen may also be used to condense and separate argon, carbon monoxide and methane from the hydrogen stream.

Noncombustible solid particles such as slag, silt, metal constituents, ash, metal silicates and other solids which do not diperse in the quency water drop to the bottom of the quency vessel where they are periodically removed through a lock-hopper. This residue has some commercial value and may be used as a soil improver; or it may be sent to a metals reclaiming unit.

It is desirable to maintain the concentration of particulate carbon in the gas cooling and scrubbing waters below about 1 weight percent. In this manner, the dispersion of carbon in water will be maintained sufficiently fluid for easy pumping through pipelines and for further processing. Further, it is important with respect to the economics of the process that the particulate carbon be removed from the cooling and scrubbing water to permit the resulting clear water to be recycled and reused for cooling and scrubbing additional synthesis gas. This separation takes place in the carbon-recovery zone.

In the carbon-recovery zone any conventional method may be used for separating clear water from the particulate carbon-water slurry comprising about .5 to 8 weight percent of solids. For example naphtha may be used to displace the water from the carbon-water dispersion. Other methods include separation of clear water from the dispersion by gravity settling, centrifuge, and filtration.

In a preferred embodiment of the process, the particulate carbon-water dispersion is mixed with a light hydrocarbon liquid fuel such as naphtha forming a light hydrocarbon liquid fuel-particulate carbon slurry and a clarified water phase. The clarified water phase is then separated from the light hydrocarbon liquid fuel-particulate-carbon slurry in a decanter, optionally admixed with make-up water, and recycled for use in quench cooling and scrubbing more effluent synthesis gas from the gas generator. Low cost fuel oil is then mixed with the light hydrocarbon liquid fuel-particulate carbon slurry. In a distillation column the light hydrocarbon liquid fuel is distilled off and reused to extract more carbon from the aforesaid particulate carbon-water dispersion. Hot fuel oil-particulate carbon slurry containing about 5 to 20 weight percent of carbon is removed from the bottom of the distillation column, optionally mixed with additional fuel oil, and pumped into the aforesaid mixer where it is admixed with the charge comprising bits of garbage and solid waste material, as previously described.

Alternately, the particulate carbon-water dispersion may be introduced into a suitable standard gravity sedimentation unit, for example one described in Perry's Chemical Engineers Handbook 4th edition, 1968, pages 19–42 to 19–54. Clear water is drawn off and recycled to the synthesis gas cooling and scrubbing zone, and thickened slurry of carbon-water comprising about 1–3 weight percent of solids is recycled to the mixer for use as the suspending medium for the masticated garbage feed. Optionally, in such case, a liquid hydrocarbon fuel may be added to the feed slurry prior to its introduction into the tubular heater.

DESCRIPTION OF THE DRAWING AND EXAMPLE

A more complete understanding of the invention may be had by reference to the accompanying schematic drawing which shows the previously described process in detail. Although the drawing illustrates a preferred continuous embodiment of the process of this invention, it is not intended to limit the invention to the particular apparatus or materials described. Quantities have been assigned to the various streams so that the description may also serve as an example.

With reference to the drawing, the raw material to be processed comprises 6,743 lbs. per hr. (pounds per hour) of garbage and solid waste material from Altoona, Pa., having the composition shown in Table III (dry basis).

The raw material feed in line 1 is introduced into size reducer 2 where by means of any suitable combination of standard crushing, grinding, slitting, cutting, pulping, and screening equipment the garbage and solid waste material is reduced to bits having a maximum dimension of about $\frac{1}{16}$ inch. The feed is then passed through line 3 into screening and separating zone 4 where 613 lbs. per hr. of the noncombustibles are separated and are sent to a materials reclaiming facility not shown by way of line 5 for example to recover metal values. The bits of garbage are then passed through line 6 into mixing and hold-up zone 7 where they are admixed with 6,130 lbs. per hour of a particulate carbon-fuel oil slurry produced subsequently in the process and comprising 1.2 wt. percent (weight percent) of particulate carbon in 9° API bunker fuel oil which is introduced into mixing slurry has a heat content of 17,640 B.t.u. per pound and vessel 7 by way of line 8. The particulate carbon-fuel the following ultimate analysis in weight percent. C—83.80, $H_2$—9.65, $N_2$—0.31, S—6.2, and ash—0.04.

From line 9, the mixture of garbage, particulate carbon, and oil is passed at a pressure of 700 p.s.i.g. by means of pump 10 through lines 11 to 13 and into heating coil 14 disposed in heater 15. In another embodiment, heater 15 may be passed by way of line 16. About 2,430 lbs. per hour of steam from line 17 at a temperature of 600° F. and a pressure of 700 p.s.i.g. are introduced into the feed stream. The volatile constituents in the feed are vaporized in heating coil 14, and at the same time the particles of garbage may be further disintegrated due to turbulent flow therein. Thus a feed dispersion of solids in oil vapor and steam at a temperature of about 600° F. leaves heating coil 14 and is passed through the center passage 18 of water cooled annulus burner 19 disposed in the upper end of noncatalytic free flow synthesis gas generator 20. The feed dispersion enters the reaction zone 21 at a velocity of about 200 feet per second where it impinges and reacts with oxygen. About 106,800 s.c.f.h. (standard cubic feet per hour) of substantially pure oxygen (99.5 mole percent) from line 22 are introduced into reaction zone 21 at a velocity of 300 feet per second by way of annulus 23 of burner 19.

Synthesis gas generator 20 is free from packing and catalyst and contains a compact free-flow refractory lined reaction zone 21. Partial oxidation of the feed dispersion takes place in the reaction zone at an autogeneous temperature of about 2,080° F. and at a pressure of about 600 p.s.i.g. About 11,480,000 standard cubic feet per day of product gas containing 82 lbs. per hr. of entrained particulate carbon and 885 lbs. per hr. of solid residue comprising ash and other noncombustible solid particles exit freely from one end of reaction zone 21. The hot synthesis gas from reaction zone 21 is discharged into quench vessel 24 and into direct intimate contact with water contained in the bottom thereof.

The raw synthesis gas at a temperature of about 425° F. and a pressure of about 600 p.s.i.g. leaves quench vessel 24 by way of line 25 having the following composition in mole percent (dry basis): Carbon monoxide—51.18, hydrogen—41.58, carbon dioxide—5.05, methane—0.79, argon and rare gases—0.05, nitrogen and trace components—0.31, hydrogen sulfide—0.98, and carbonyl sulfide—0.06.

This gas may be washed further in a conventional gas scrubbing zone not shown to remove any remaining fine carbon particles. Depending upon its final use, the raw synthesis gas may be then processed by conventional methods such as previously described to remove $CO_2$, $H_2S$, A, and COS thereby producing mixtures of hydrogen and carbon monoxide, or fuel gas.

About 885 lbs. per hr. of solid residue leave by way of a lock-hopper system at the bottom of quench vessel 24 comprising lines 26–29, valves 30–31, and vessel 32. The particles of solid residue contain metal silicates and other reaction products of the glass and metals in the feedstock, and ash from the reacted petroleum fuel oil which includes the oxides, sulfides, or salts of such heavy metals as vanadium, nickel, iron, chromium, and molybdenum. This residue is useful as a soil improver, or may be sent to a metals reclaiming zone.

About 81 lbs. per hr. of particulate carbon-water dispersion comprising about 1.0 wt. percent of particulate carbon are drawn off from the bottom of quench vessel 24 by way of line 33 and are introduced into carbon-recovery zone 34 by way of line 35 where naphtha is used to extract the carbon from the particulate carbon-water dispersion, thereby forming a naphtha-particulate carbon dispersion and clear water which separates out by gravity in a decanter not shown. About 8,200 lbs. per hr. of said clear water from carbon recovery zone 34 are recycled by way of line 36 to quench vessel 24 for cooling synthesis gas.

About 800 lbs. per hr. of 9° API bunker fuel oil are introduced into carbon-recovery zone 34 by way of lines 37-38 to extract the particulate carbon from the aforesaid naphtha-particulate carbon dispersion thereby forming a fuel oil-particulate carbon slurry from which the naphtha is separated by means of distillation in a naphtha still not shown. The naphtha is distilled off and reused. By means of pump 39 the particulate carbon-fuel oil slurry from the naphtha still bottoms plus 5,425 lbs. per hr. of make-up 9° API bunker fuel oil having a gross heating value of 17,640 B.t.u. per pound from lines 37 and 40 are pumped through lines 41, 42 and 8 into mixing zone 7, as previously mentioned.

Obviously many modifications and variations of the invention as hereinbefore set forth may be made without departing from the spirit and scope thereof, and only such limitations should be imposed as are indicated in the appended claims.

We claim:
1. A process for disposing of garbage and solid waste matter comprising
   (1) reducing the size of said material to bits of garbage and solid waste matter in a size reduction zone;
   (2) mixing the bits of material from (1) in a mixing zone with a fluid selected from the group consisting of $H_2O$, liquid hydrocarbon fuel, liquid hydrocarbon fuel-particulate carbon slurry, particu- produce a feed mixture;
   (3) introducing said feed mixture from (2) into the reaction zone of a free-flow unpacked noncatalytic synthesis gas generator; and
   (4) reacting said feed mixture by partial oxidation with an oxygen-rich gas and steam at an autogenous temperature in the range of about 1500 to 3000° F. and at a pressure in the range of about 1 to 250 atmospheres to produce a hot gaseous effluent stream comprising hydrogen, carbon monoxide, carbon dioxide, water, and particulate carbon.

2. The process of claim 1 with the additional step of heating the feed mixture from step (2) in a heating zone to produce a feed dispersion comprising bits of garbage and solid waste matter, particulate carbon, liquid and vaporized hydrocarbon fuel, and steam, and introducing said feed dispersion into said reaction zone in step (3) as said feed mixture.

3. The process of claim 1 with the additional steps of cooling and scrubbing said hot gaseous effluent stream from the reaction zone in step (4) with water in a gas cooling and scrubbing zone, separating said entrained particulate carbon from said gaseous effluent stream by forming a particulate carbon-water dispersion, separating clear water from said particulate carbon-water dispersion in a carbon-recovery zone while producing a liquid hydrocarbon fuel-particulate carbon slurry, recycling said clear water to said cooling and scrubbing zone, and recycling said liquid hydrocarbon fuel-particulate carbon slurry to said mixing zone to provide at least a portion of said fluid in step (2).

4. The process of claim 1 with the additional steps of cooling and scrubbing said hot gaseous effluent stream from the reaction zone with water in a gas cooling and scrubbing zone, separating said entrained particulate carbon from said gaseous effluent stream by forming a particulate carbon-water dispersion, separating clear water from said particulate carbon-water dispersion in a carbon-recovery zone while producing a particulate carbon-water slurry, recycling said clear water to said cooling and scrubbing zone, and recycling said particulate carbon-water slurry to said mixing zone as at least a portion of said fluid in step (2).

5. The process of claim 1 with the additional step of introducing the feed mixture of step (2) into the reaction zone of said synthesis gas generator by way of the inner conduit of an annulus-type burner at a velocity in the range of about 5 to 50 feet per second, and contacting said feed mixture in said reaction zone with a stream of oxygen-rich gas which is introduced into said reaction zone by way of the annulus of said burner at a velocity in the range of about 100 feet per second to sonic velocity.

6. A process for the production of synthesis gas or fuel gas comprising reducing the size of garbage to small pieces in a size reduction zone and mixing same in a mixing zone with a fluidizing medium comprising a liquid hydrocarbon fuel-particulate carbon slurry produced subsequently in the process to produce a pumpable feed slurry stream; heating said feed slurry stream to a temperature in the range of about 212 to 600° F. to produce a feed dispersion stream comprising bits of garbage, particulate carbon, liquid and vaporized hydrocarbon fuel, and steam; introducing said feed dispersion stream into the reaction zone of a free-flow unpacked noncatalytic synthesis gas generator; reacting said feed dispersion stream in said reaction zone by partial oxidation with an oxygen-rich gas and steam at an autogenous temperature in the range of about 1500 to 3000° F., a pressure in the range of about 1 to 250 atmospheres, an atomic ratio of free oxygen to carbon in the feed in the range of about 0.8 to 1.4, a weight ratio of water to carbon in the feed in the range of about 0.2 to 3.0, and a time in the reaction zone in the range of about 1 to 10 seconds to produce a hot gaseous effluent stream comprising CO, $H_2$, $CO_2$, $H_2O$ and minor amount of $N_2$, A, $CH_4$, particulate carbon, and noncombustible solid particles; cooling said hot gaseous effluent stream from the reaction zone and separating therefrom said noncombustible solid particles; introducing the cooled effluent gas stream into a carbon recovery zone and separating therefrom said particulate carbon as a liquid hydrocarbon fuel-particulate carbon slurry; and introducing said liquid hydrocarbon fuel-particulate carbon slurry into said mixing zone as said fluidizing medium.

References Cited
UNITED STATES PATENTS

| | | | |
|---|---|---|---|
| 1,777,449 | 10/1930 | Rath | 48—209 UX |
| 2,126,150 | 8/1938 | Stryker | 48—209 UX |
| 3,362,887 | 1/1968 | Rodgers | 48—209 X |
| 3,471,275 | 10/1969 | Borggreen | 48—209 |

FOREIGN PATENTS

| | | | |
|---|---|---|---|
| 301,427 | 11/1928 | Great Britain | 201—25 |

MORRIS O. WOLK, Primary Examiner

R. E. SERWIN, Assistant Examiner

U.S. Cl. X.R.

48—197 R, 215; 110—8 R, C

PO-1050
(5/69)

UNITED STATES PATENT OFFICE
CERTIFICATE OF CORRECTION

Patent No. 3,671,209          Dated June 20, 1972

Inventor(s) CHARLES F. TEICHMANN and ALBERT BRENT

It is certified that error appears in the above-identified patent and that said Letters Patent are hereby corrected as shown below:

Col. 4, line 27     After "fuel" change "and" to --the--

Col. 5, line 50     Change "$CO_3$" to --$CO_2$--

Col. 7, line 12     Change "8" to --3--

Col. 8, lines 5 and 6     Interchange order of lines 5 and 6 and after "fuel" insert --oil--

Col. 9, line 32     After "particu-" insert --late carbon-water slurry, and mixtures thereof to--

Signed and sealed this 10th day of July 1973.

(SEAL)
Attest:

EDWARD M. FLETCHER, JR.       Rene Tegtmeyer
Attesting Officer              Acting Commissioner of Patents